United States Patent
Ganchev et al.

(10) Patent No.: US 11,922,185 B2
(45) Date of Patent: *Mar. 5, 2024

(54) DEPLOYMENT AND ISOLATION OF PLUGINS IN A VIRTUALIZED COMPUTING ENVIRONMENT

(71) Applicant: VMware LLC, Palo Alto, CA (US)

(72) Inventors: Tony Ganchev, Sofia (BG); Plamen Dimitrov, Sofia (BG); Aleksandar Marinov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,122

(22) Filed: May 2, 2022

(65) Prior Publication Data
US 2022/0261259 A1    Aug. 18, 2022

Related U.S. Application Data

(63) Continuation of application No. 16/507,035, filed on Jul. 10, 2019, now Pat. No. 11,321,101.

(51) Int. Cl.
| | |
|---|---|
| *G06F 9/445* | (2018.01) |
| *G06F 8/61* | (2018.01) |
| *G06F 9/451* | (2018.01) |
| *G06F 9/455* | (2018.01) |
| *H04L 67/56* | (2022.01) |

(52) U.S. Cl.
CPC ............ *G06F 9/44526* (2013.01); *G06F 8/61* (2013.01); *G06F 9/452* (2018.02); *G06F 9/455* (2013.01); *H04L 67/56* (2022.05); *G06F 9/45533* (2013.01)

(58) Field of Classification Search
None
See application file for complete search history.

(56) References Cited

U.S. PATENT DOCUMENTS

| | | | |
|---|---|---|---|
| 8,533,336 B1* | 9/2013 | Scheffler | ................. G06F 9/452 717/177 |
| 8,856,740 B2* | 10/2014 | Wilson | ................. G06F 9/44526 717/121 |
| 8,924,592 B2 | 12/2014 | Jakubowski | |

(Continued)

OTHER PUBLICATIONS

Andrew Cho et al., "JWS: A Flexible Web Service", Australian Computer Society, Inc., 2008, pp. 1-8.

(Continued)

*Primary Examiner* — Hiren P Patel
(74) *Attorney, Agent, or Firm* — King Intellectual Asset Management (57) ABSTRACT

In an architecture of a virtualized computing system plugins are less tightly integrated with a core user interface of a management server. Rather than being installed and executed at the management server as local plugins, the plugins are served as remote plugins from a plugin server, and may be accessed by a web client through a reverse proxy at the management server. Plugin operations may be executed at the plugin server and/or invoked from a user device where the web client resides. Furthermore, a plugin sandbox and other isolation configurations are provided at the user device, so as to further control access capability and interaction of the plugins.

16 Claims, 5 Drawing Sheets

(56) References Cited

U.S. PATENT DOCUMENTS

| | | | |
|---|---|---|---|
| 8,998,721 B2 * | 4/2015 | Lagercrantz | G07F 17/3225 463/43 |
| 9,009,739 B2 | 4/2015 | Labour et al. | |
| 9,070,211 B1 | 6/2015 | Kroeger et al. | |
| 9,195,480 B2 | 11/2015 | Wang et al. | |
| 9,542,368 B1 | 1/2017 | Dorwin | |
| 9,674,168 B2 * | 6/2017 | Kottahachchi | H04L 63/08 |
| 9,767,296 B2 | 9/2017 | Faitelson et al. | |
| 9,785,772 B1 | 10/2017 | Johansson et al. | |
| 10,324,702 B2 * | 6/2019 | Vishnepolsky | H04L 67/563 |
| 10,536,359 B2 | 1/2020 | Kandula et al. | |
| 10,542,022 B2 * | 1/2020 | Shah | H04L 67/02 |
| 10,761,825 B2 * | 9/2020 | Levac | G06F 11/3006 |
| 10,795,646 B2 * | 10/2020 | Dimitrov | G06F 8/41 |
| 11,126,417 B2 * | 9/2021 | Levac | G06F 8/61 |
| 11,252,194 B2 * | 2/2022 | Kipp | H04L 63/20 |
| 2003/0119386 A1 * | 6/2003 | Laux | H04L 67/289 439/894 |
| 2006/0085423 A1 * | 4/2006 | Barsness | H04L 41/5083 |
| 2008/0059479 A1 * | 3/2008 | Lin | G06F 16/24575 |
| 2008/0104223 A1 * | 5/2008 | D'Amora | H04L 67/10 709/224 |
| 2008/0235180 A1 * | 9/2008 | Anand | G06F 16/283 |
| 2008/0295110 A1 * | 11/2008 | Muscarella | G06F 9/445 719/311 |
| 2010/0312879 A1 * | 12/2010 | Taieb | G06F 9/5055 709/224 |
| 2013/0145361 A1 | 6/2013 | Kaegi | |
| 2013/0190080 A1 | 7/2013 | Bibbey et al. | |
| 2014/0245437 A1 * | 8/2014 | Shah | H04L 67/02 726/22 |
| 2014/0317639 A1 * | 10/2014 | You | G06F 9/44526 719/318 |
| 2015/0121375 A1 | 4/2015 | Balasubramanyam et al. | |
| 2015/0281318 A1 | 10/2015 | Warner et al. | |
| 2015/0309971 A1 * | 10/2015 | Cowley | G06Q 50/16 715/234 |
| 2016/0315884 A1 | 10/2016 | Clark et al. | |
| 2017/0359327 A1 | 12/2017 | Kottahachchi et al. | |
| 2018/0026831 A1 | 1/2018 | Chen et al. | |
| 2018/0026842 A1 | 1/2018 | Tal et al. | |
| 2018/0027007 A1 * | 1/2018 | Shah | H04L 67/02 726/22 |
| 2018/0322136 A1 | 11/2018 | Carpentier et al. | |
| 2019/0045033 A1 * | 2/2019 | Agerstam | H04W 4/70 |
| 2019/0121963 A1 | 4/2019 | Coleman et al. | |
| 2019/0303123 A1 * | 10/2019 | Levac | G06F 8/71 |
| 2020/0019413 A1 | 1/2020 | Spence | |
| 2020/0348920 A1 | 11/2020 | Levac | G06F 11/302 |
| 2021/0011742 A1 | 1/2021 | Ganchev et al. | |

OTHER PUBLICATIONS

Maarten Wijnants et al., "The NIProxy: a Flexible Proxy Server Supporting Client Bandwidth Management and Multimedia Service Provision", 2007 IEEE, 2007, pp. 1-9.

* cited by examiner

DEPLOYMENT AND ISOLATION OF PLUGINS IN A VIRTUALIZED COMPUTING ENVIRONMENT

CROSS-REFERENCE TO RELATED APPLICATION

The present application is a continuation application under 35 U.S.C. § 120 of U.S. patent application Ser. No. 16/507,035, filed on Jul. 10, 2019, now U.S. Pat. No. 11,321,101, which is incorporated herein by reference in its entirety.

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory, and network resources to run an operating system and different applications.

In a virtualized computing environment, users (such as system administrators) may manage, monitor, and administer various objects (e.g., hosts, virtual machines, storage resources, etc.) using a web client. The web client is generally a browser-based interface that may be used by the users to remotely interact with a management entity in order to manage, monitor, and administer the objects in the virtualized computing environment. For this interaction, the management entity may provide a user interface that is usable through the web client to access and operate software, applications, services, and other resources and functionality of the management entity.

The user interface provided by the management entity, and which is used by the web client, is typically a default or core user interface. In some cases, users may wish to customize the web client to support new functionality that is more specific to the users' applications. This customization may be performed through the use of plugins or other software/code that is tightly integrated with the core user interface at the management entity. For example, the plugins/code may be installed and executed at the management entity. However, installing and executing plugins at the management entity causes problems with respect to resource consumption, security, system stability, and compatibility. For instance, an incompatible or badly written plugin could crash the core user interface at the management entity, thereby making the core user interface or perhaps the entire management entity inoperable for multiple users. As another example, some plugins may interfere with each other, or may undesirably access sensitive information stored at the management entity or in other plugins.

SUMMARY

According to one aspect, a method is provided to operate plugins in a virtualized computing environment. The method includes: installing the plugins at a plugin server remote from a management server for the virtualized computing environment, for execution remotely from the management server; loading, via a first port of a reverse proxy of the management server and into a user interface of a web client, elements of a core user interface from the management server; loading, via a second port of the reverse proxy of the management server and into the user interface of the web client, elements of a first plugin from the plugin server; and isolating at least some of the loaded elements of the first plugin from the core user interface.

According to another aspect, a non-transitory computer-readable medium has instructions stored thereon, which in response to execution by one or more processors, cause the one or more processors to perform or control performance of operations that pertain to plugins in a virtualized computing environment. The operations include: installing the plugins at a plugin server remote from a management server for the virtualized computing environment, for execution remotely from the management server, wherein elements of a core user interface from the management server are loaded, via a first port of a reverse proxy of the management server, into a user interface of a web client; loading, via a second port of the reverse proxy of the management server and into the user interface of the web client, elements of a first plugin from the plugin server; and isolating at least some of the loaded elements of the first plugin from the core user interface.

According to still another aspect, a system includes: a management server for a virtualized computing environment, wherein the management server includes a reverse proxy, and wherein the management server is configured to load, via a first port of the reverse proxy and into a user interface of a web client, elements of a core user interface from the management server; and a plugin server configured to remotely communicate with the management server via the reverse proxy of the management server, wherein the plugin server includes plugins installed therein for execution remotely from the management server, wherein the plugin server is further configured to load, via a second port of the reverse proxy and into the user interface of the web client, elements of a first plugin from the plugin server, and wherein at least some of the loaded elements of the first plugin are isolated from the core user interface.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by providing a configuration wherein plugins are less tightly integrated with a core user interface of a management server. Rather than being installed and executed at the management server as local plugins, the plugins are served as remote plugins from a plugin server separate and remote from the management server, and may be accessed by a web client through a reverse proxy at the management server. Plugin operations may be executed at the plugin server and/or invoked from a user device where the web client resides. Furthermore, a plugin sandbox and other isolation configurations are provided at the user device, so as to further control access capability and interaction of the plugins.

Computing Environment

The technology described herein may be implemented in some embodiments in a virtualized computing environment, such as a software-defined datacenter (SDDC). With virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 that can implement the deployment and isolation of plugins. Depending on the desired implementation, virtualized computing environment 100 may include additional and/or alternative components than that shown in FIG. 1.

Figure 1:
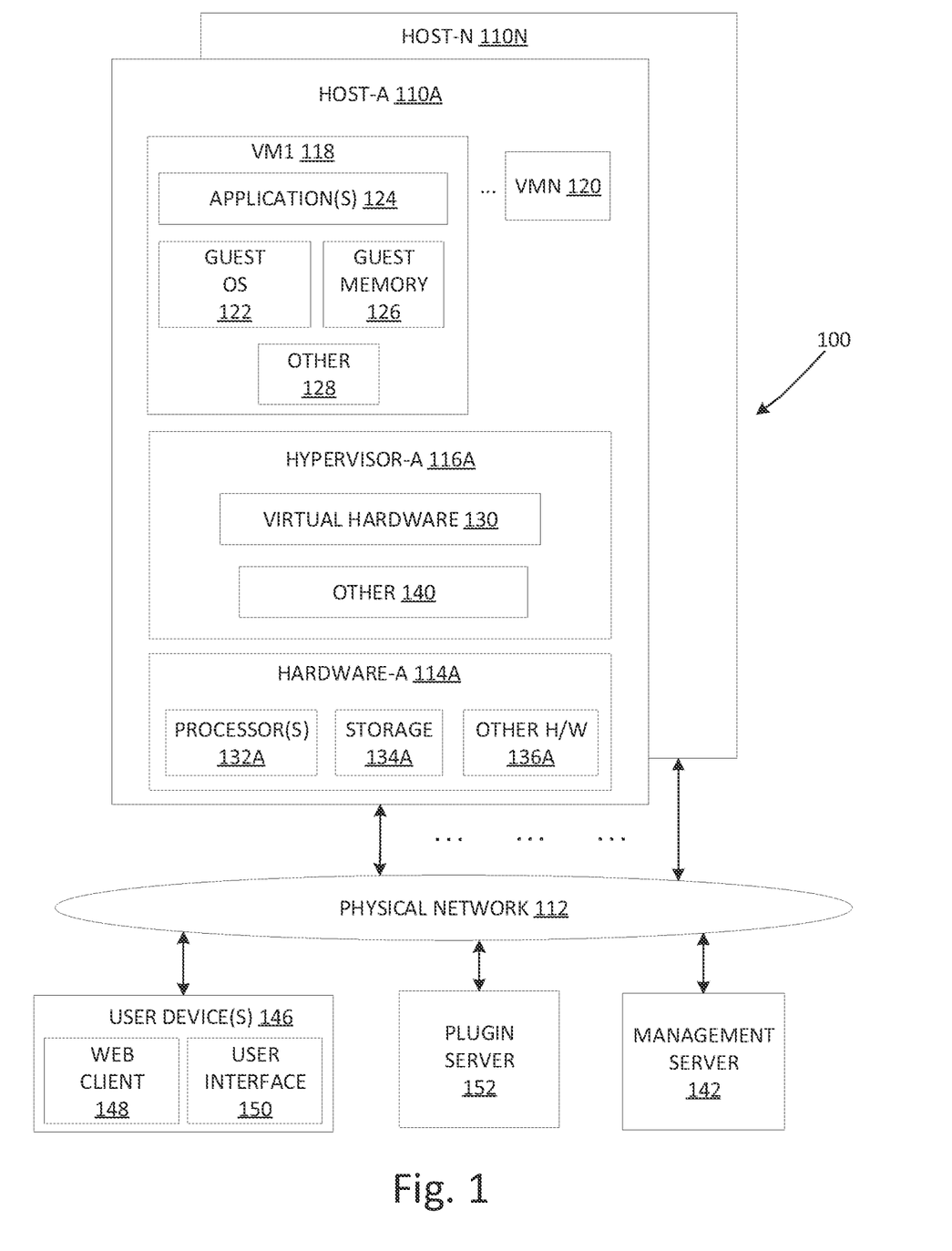
FIG. 1 is a schematic diagram illustrating an example virtualized computing environment that can implement the deployment and isolation of plugins.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. The interconnected hosts may in turn form part of a cluster. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 128, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include other elements, generally depicted at 140, such as services, daemons, agents, etc.

Hardware-A 114A in turn includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A management server 142 or other management entity of one embodiment can take the form of a physical computer with functionality to manage or otherwise control the operation of host-A 110A . . . host-N 110N and their corresponding VMs. In some embodiments, the functionality of the management server 142 can be implemented in a virtual appliance, for example in the form of a single-purpose VM that may be run on one of the hosts in a cluster or on a host that is not in the cluster. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100. The management server 142 may be a physical computer or a virtual appliance that provides a management console and other core user interface tools that are directly or remotely accessible to a system administrator or other user. Further details of the elements of the management server 142 will be provided below with respect to FIG. 2.

The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is also managed by the management server 142. For the sake of clarity, the management server 142 is depicted in FIG. 1 as a separate standalone physical or virtual machine. In some embodiments, the functionality of the management server 142 may be implemented in any of host-A 110A . . . host-N 110N, instead of being provided as a separate standalone device such as depicted in FIG. 1. There may be a single management server 142 that is provisioned for managing a single cluster of hosts, or a single management server 142 may be provisioned for managing multiple clusters. Moreover, the virtualized computing environment 100 may include multiple management servers 142.

A plugin server 152 may be communicatively coupled to the management server 142 via the physical network 112. As will be described further below with respect to FIG. 2, plugins can reside in the plugin server 152, and such plugins can be registered with the management server 142 and loaded or otherwise invoked by a user device 146 for purposes of extending the functionality of the tools (such as a core user interface) at the management server 142. The plugin server 152 may be a standalone device that is implemented as a physical machine or as a virtual appliance, or implemented at least in part as a hardware element (such as a storage array).

A user may operate the user device 146 to access, via the physical network 112, the functionality of VM1 118 . . . VMN 120, using a web client 148. The user device 146 can be in the form of a computer, including desktop computers and portable computers (such as laptops and smart phones). In one embodiment, the user may be a system administrator that also uses the web client 148 of the user device 146 to remotely communicate with the management server 142 for purposes of using tools (such as a core user interface) at the management server 142 for performing operations such as configuring, provisioning, managing, monitoring, remediating faults, etc. for the VMs and hosts.

The user device 146 may also include a user interface 150 to support the interaction of the web client 148 with the management server 142. The user interface 150 may comprise part of the web client 148 (e.g., a web-based user interface), or may be external to the web client 148 (such as a user interface that is provided by some other application installed in the user device 146 and which can communicate with the web client 148). The user interface 150 of one embodiment can comprise elements of the core user interface that are obtained/accessed/loaded from the management server 142, with extensions or other customization provided by one or more plugins from the plugin server 152.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Plugin Deployment

Figure 2:
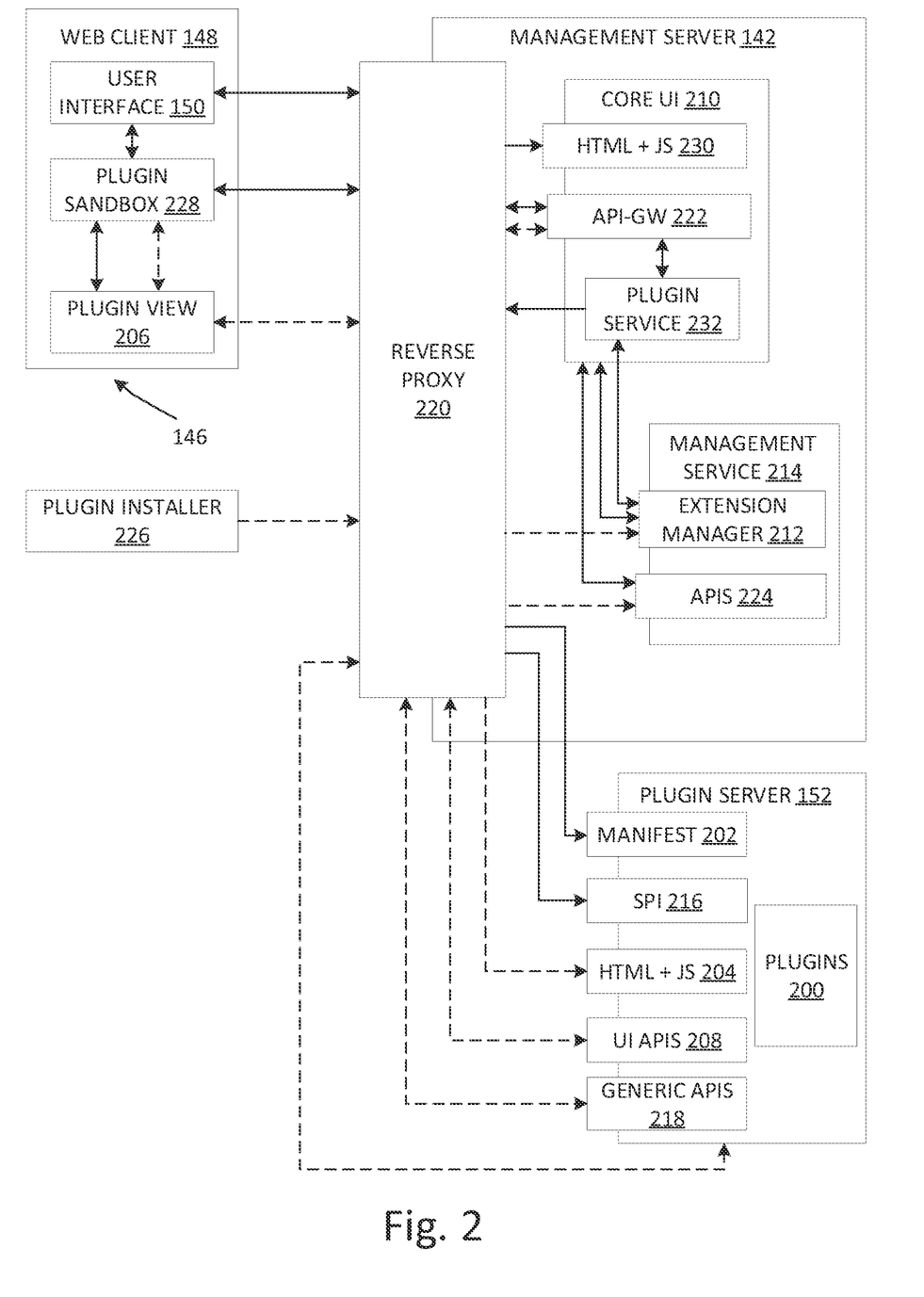
FIG. 2 is a schematic diagram illustrating further details of an example architectural arrangement of a management server, user device, and plugin server for the virtualized computing environment of FIG. 1.

FIG. 2 is a schematic diagram illustrating further details of an example architectural arrangement of the management server 142, the user device 146, and the plugin server 152 for the virtualized computing environment 100 of FIG. 1. In FIG. 2, the solid-line, single-headed and double-headed arrows represent platform operations, while the broken-line, single-headed and double-headed arrows represent plugin operations. For the sake of clarity, the interconnections via the physical network 112 are not depicted in FIG. 2.

With respect to the plugin server 152, the plugin server 152 may host one or more remote plugin elements that would otherwise have resided in the management server 142 as local plugin elements and which could have potentially caused operational issues if residing and executing at the management server 142 as part of a local plugin. Such elements include at least one plugin 200, a plugin manifest 202, hypertext markup language (HTML) and javascript (JS) 204 of user interface content that can be retrieved by the web client 148 for a plugin view 206, and user interface application program interfaces (APIs) 208 that can be called by the web client 148 for the plugin view 206.

The plugin 200 of one embodiment may be executed at the plugin server 152, where such execution is triggered by the user operating the user interface 150 of the web client 148 at the user device 146. In other embodiments, the web client 148 may load the plugin 200 from the plugin server 152, and execute or otherwise invoke the plugin 200 from the user device 146. There may be multiple plugins 200 in the plugin server 152. The multiple plugins 200 may be different plugins, multiple instances of the same plugin, or different versions of a particular plugin. Such plugin(s) 200 may be served by the plugin server 152 to multiple different user devices 146.

The plugin manifest 202 describes the places/locations in a core user interface 210 (in the management server 142) that are being extended by the plugin 200. The plugin manifest 202 is registered with an extension manager 212 of a management service 214 in the management server 142, thereby enabling the extension manager 212 to maintain a list of registered plugins (e.g., the plugin 200) that are authorized plugins for the core user interface 210.

The plugin server 152 may further include a service provider interface (SPI) 216, which is configured to compute dynamic extensions (such as menus, user interface table of contents, etc.). The plugin server 152 may include still further elements, such as generic APIs 218.

In operation, the communications between the plugin server 152, and the management server 142 and the web client 148 of the user device 146, runs through a reverse proxy 220. The reverse proxy 220 of one embodiment is an element of the management server 142, and is configured to present a single network address (e.g., on the left side of the reverse proxy 220 in FIG. 2) to the web client 148. Thus, an incoming communication from the web client 148 is directed to the single network address, and then the reverse proxy 220 processes the incoming communication to determine which one or more locations (e.g., on the right side of the reverse proxy 220 in FIG. 2) to route the communication. The communication could be sent to the core user interface 210, to the management service 214, to the plugin server 152, and/or to some other endpoint(s).

Similarly, the plugin server 152 can communicate with the management server 142 via the reverse proxy 220. For example, the plugin server 152 can communicate with an API gateway (API-GW) 222 of the core user interface 210, via the reverse proxy 220, to execute management-related operations that are initiated from the user interface 150 of the web client 148 interacting with the plugin 200. As another example, the plugin server 152 may communicate, via the reverse proxy 220, the plugin manifest 202 to the extension manager 212, as well as communicating other instructions/requests to the management service 214 (which may be handled through APIs 224.

In one embodiment, some of the functionality of the plugin server 152 may alternatively or additionally be provided by a plugin installer 226. For instance, the plugin installer 226 may register the plugin manifest 202, metatada of the plugin 200, or a uniform resource locator (URL) address of the plugin server 152, with the extension manager 212 via the reverse proxy 220.

Referring now back to the client device 146 of FIG. 2, the plugin view 206 of one embodiment is served by the plugin server 152 (via the reverse proxy 220), and is configured to communicate (also via the reverse proxy 220) with the APIs 208 and 218 of the plugin server 152, and with the API-GW 222 of the core user interface 210 of the management server 142 and the management service 214. The user interface 150 of the web client 148 may host or otherwise render the plugin view 206 (including communicating with the SPI 216 for content to place in the plugin view 206), and may also communicate with the API-GW 222 of the core user interface 210 of the management server 142 to perform managerial operations.

According to one embodiment, the web client 148 may further include a plugin sandbox 228. The plugin sandbox 228 is configured to: expose front-end APIs to the plugin view 206, provide session information, and provide isolation between plugins so that one plugin does not affect the behavior of another plugin. For example, a plugin is prevented from stealing a token given to another plugin, or a plugin is prevented from reading data placed in local storage by another plugin since access to a browser's local storage is blocked and a local storage API of the web client 148 is not exposed to the plugin view 206. Further details of the sandbox 228 will be provided later below.

Now referring back to the management server 142 of FIG. 2, the core user interface 210 of one embodiment includes HTML and JS 230 of static user interface content/elements that can be rendered by the user interface 150 of the web client 148 at the client device 146. In addition to the HTML and JS 230 and the API-GW 222, the core user interface 210 may further include a plugin service 232. The plugin service 232 of one embodiment is configured to enable integration of the plugins from the plugin server 152 with the core user interface 210, to discover plugins that have been registered with the extension manager 212, and to communicate with the SPI 216 of the plugin 200 for authentication purposes.

In addition to the interactions described previously above, the API-GW 222 of one embodiment may be configured to perform one or more of: query available plugins through directory services, register forwarding/redirection rules to the plugin server 152 with the reverse proxy 220, provide a plugin API that lists the metadata of registered plugins, and provide plugin notification (via a notifications service) to inform the user device 146 (or other front-end device) of changes to the list of registered plugins.

Plugin Isolation

In addition to the inherent isolation that results from remotely locating the plugins 200 at the plugin server 152 and thus preventing the plugins from executing at the management server 142, further plugin isolation features may be provided at the user device 146. Plugin isolation can be in the form of isolation of a plugin from the core user interface 210 (FIG. 3) and isolation between plugins (FIG. 4). Isolation may be desirable, for example, to prevent a plugin from undesirably modifying a layout of the core user interface 210 or from stealing sensitive information from the core user interface 210. Similarly, isolation between plugins may be desirable, for example, to prevent one plugin from stealing sensitive information of another plugin or to prevent one plugin from undesirably modifying another plugin.

Figure 3:
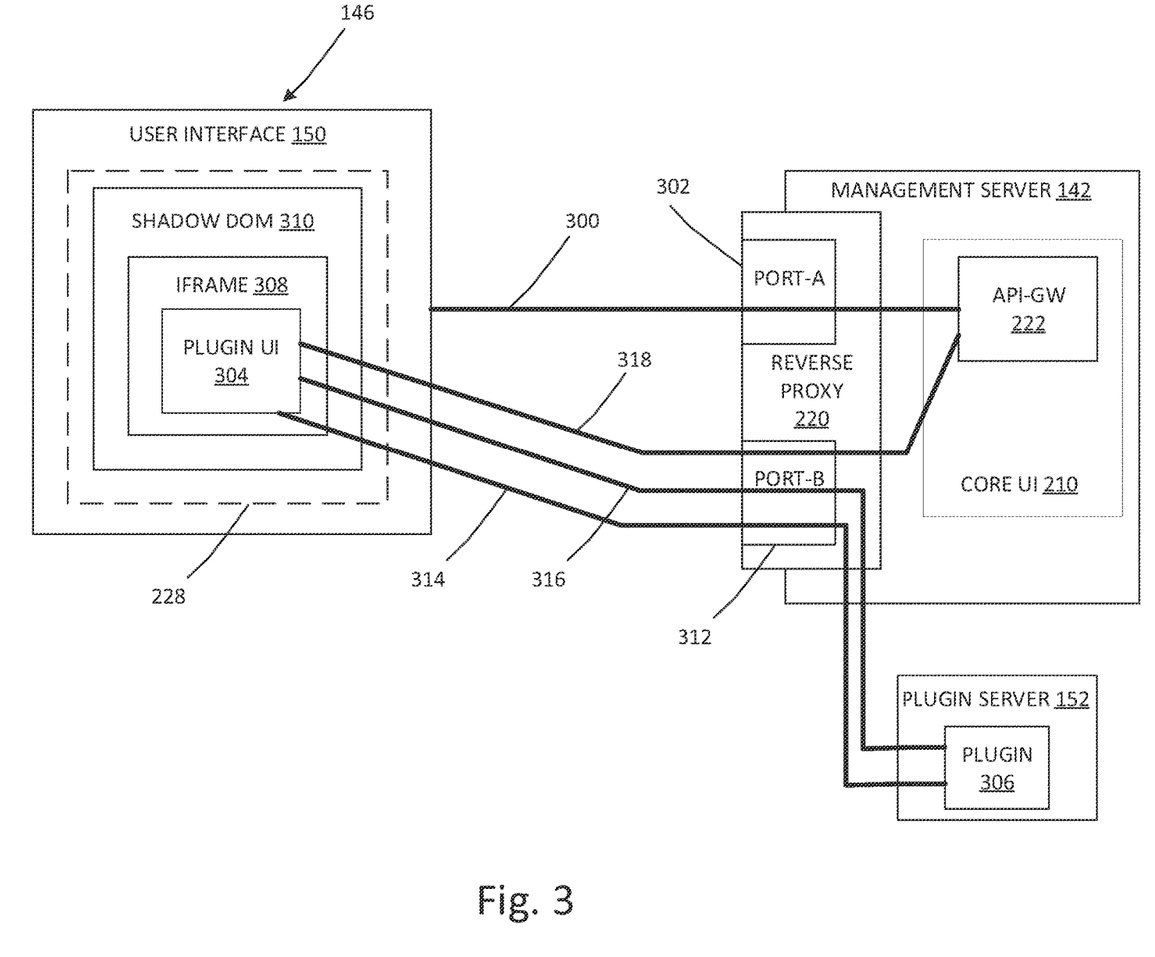
FIG. 3 is a schematic diagram illustrating an example of plugin isolation in the user device for the virtualized computing environment of FIG. 1.
Figure 4:
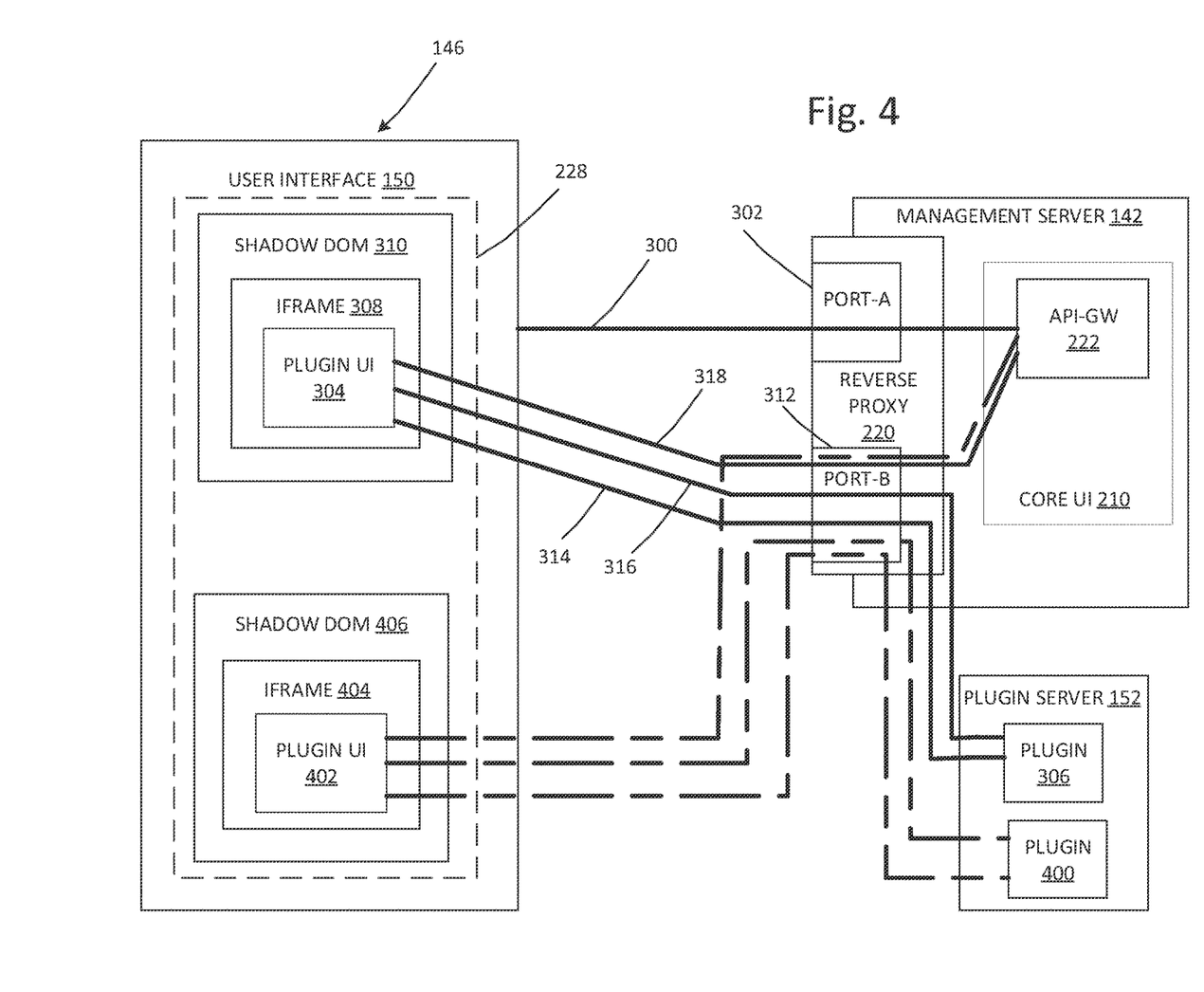
FIG. 4 is a schematic diagram illustrating another example of plugin isolation in the user device for the virtualized computing environment of FIG. 1.

For example, FIG. 3 is a schematic diagram illustrating plugin isolation in the user device 146 for the virtualized computing environment 100. As previously explained above, the user interface 150 (at the user device 146) may be used to perform management operations, by rendering elements of the core user interface 210 residing at the management server 142. The web client 148 loads user interface elements of the core user interface 210 into the user interface 150, by communicating with the API-GW 222 to obtain user interface elements to be rendered, to make API calls, etc. Such communication may be performed through a communication 300 via a first port-A 302 of the reverse proxy 220.

With respect to elements of a plugin user interface 304 that is to be rendered in the user interface 150, such elements of the plugin user interface 304 may be obtained from a corresponding plugin 306 that resides in the plugin server 152. The elements of the plugin user interface 304 may be loaded inside of an iframe 308, which is in turn associated with a shadow domain object model (shadow DOM) 310. In this manner with the use of the iframe 308 and the shadow DOM 310, the DOM corresponding to the core user interface 210 rendered by the user interface 150 will be different from the DOM (the shadow DOM) of the plugin user interface 304. The plugin user interface 304, the iframe 308, and the shadow DOM 310 may all be contained within the common plugin sandbox 228.

Moreover, isolation between the core user interface 210 and the plugin user interface 304 is possible through the use of a second port-B 312 of the reverse proxy 220. For example, elements of the plugin user interface 304 may be obtained (for loading into the iframe 308) through a communication 314 that runs between the plugin user interface 304 and the plugin server 152, via the second port-B 312. Similarly running through the second port-B 312 are a communication 316 from the plugin user interface 304 to the plugin server 152 for API calls to the plugin 306, and a communication 318 from the plugin user interface 304 to the API-GW 222 for API calls to the core user interface 210.

Thus from the foregoing, the reverse proxy 220 accepts connections on the two ports (port-A 302 and port-B 312). Endpoints that the user interface 150 (to render elements of the core user interface 210) communicates with are available through the port-A 302. Endpoints that the plugin user interface 304 communicates with are available through the port-B 312. This arrangement ensures that plugins will not try to steal sensitive information from the core user interface 210 by making a request to some resource of the core user interface via the first port-A 302.

FIG. 4 is a schematic diagram illustrating another example of plugin isolation in the user device 146 for the virtualized computing environment 100 of FIG. 1. Specifically, FIG. 4 shows the deployment and isolation of two plugins. For instance in FIG. 4, the plugin server 152 (or some other plugin server) may serve another plugin 400 in addition to the plugin 306. Elements of a corresponding plug in user interface 402 are obtained from the plugin 400 and loaded into another iframe 404, which is associated with a shadow DOM 406. The loading/communication (shown in broken lines) may be performed via the second port-B 312 in a manner similar to as described above with respect to FIG. 3.

Even though both plugins 306 and 400 and the elements/communications related thereto are being communicated through the same second port-B 312, isolation is provided between the plugin user interface 304 and the plugin user interface 402, due to the use of the different respective shadow DOMs 310 and 406. Furthermore, the plugin user interface 304 and the plugin user interface 402 may operate in the same plugin sandbox 228, or may be operate in respective different plugin sandboxes.

Method to Deploy and Isolate Plugins

Figure 5:
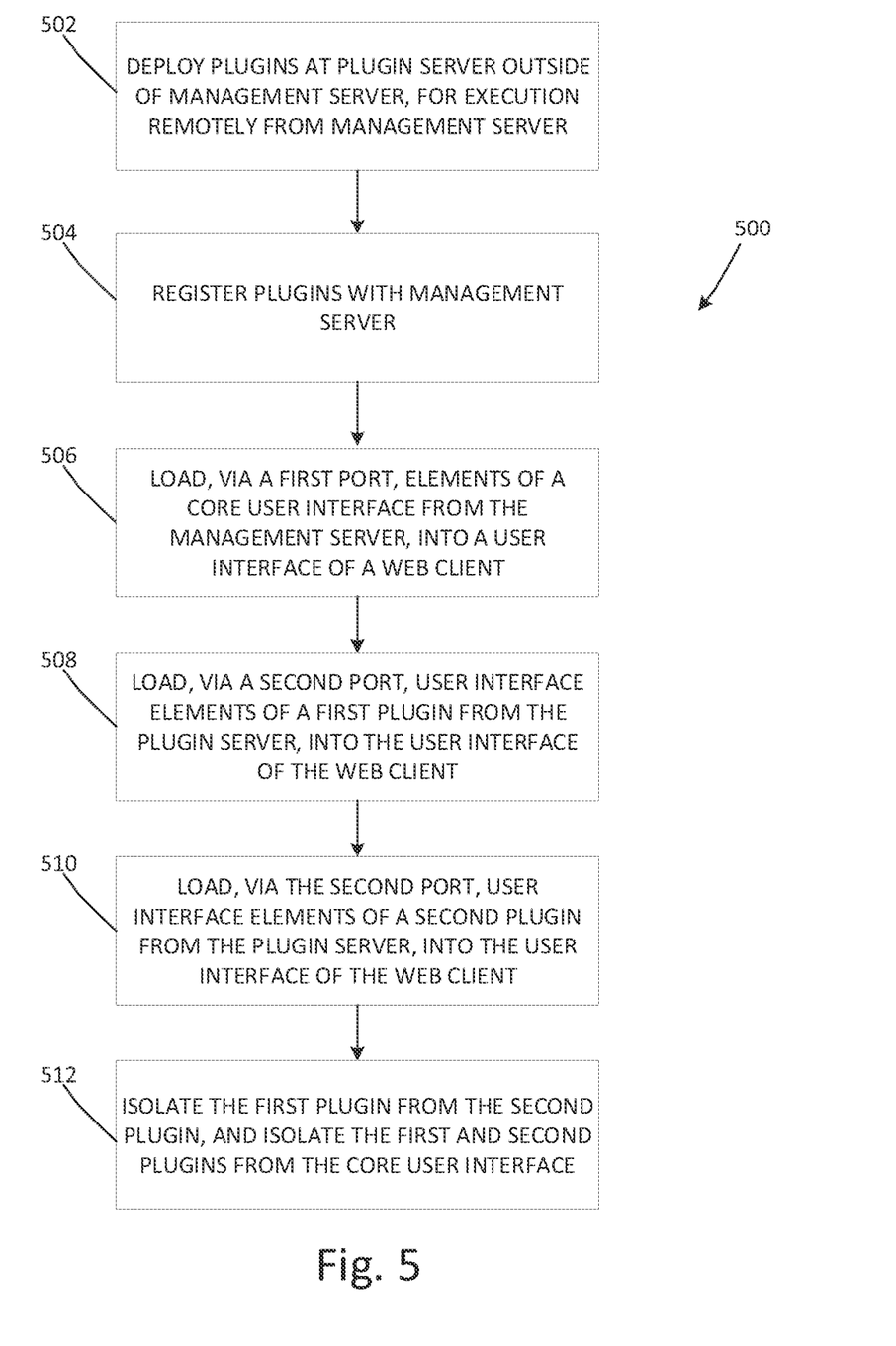
FIG. 5 is a flowchart of an example method to deploy and isolate plugins in the virtualized computing environment of FIG. 1.

FIG. 5 is a flowchart of an example method 500 to deploy and isolate plugins. The method 500 can be implemented in the virtualized computing environment 100 in one embodiment. In another embodiment, the method 500 can be implemented in some other type of computing environment (which may not necessarily involve a virtualized computing environment), wherein it would be beneficial to separate the execution of plugins from a core user interface. The example method 500 may include one or more operations, functions, or actions illustrated by one or more blocks, such as blocks 502 to 512. The various blocks of the method 500 and/or of any other process(es) described herein may be combined into fewer blocks, divided into additional blocks, supplemented with further blocks, and/or eliminated based upon the desired implementation.

The method 500 of FIG. 5 can be explained herein with reference to the elements shown in FIGS. 2-4. In one embodiment, the operations of the method 500 may be performed in a pipelined sequential manner. In other embodiments, some operations may be performed out-of-order, in parallel, etc.

The method 500 may begin at a block 502 ("DEPLOY PLUGINS AT PLUGIN SERVER OUTSIDE OF MANAGEMENT SERVER, FOR EXECUTION REMOTELY FROM MANAGEMENT SERVER"), wherein the plugin installer 226 and/or some other element installs the plugins 200 at the plugin server 152. By being installed at the plugin server 152, the plugins 200 therefore are able to execute outside of the management server 142 and thus have some degree of isolation from the core user interface 210.

Next at a block 504 ("REGISTER PLUGINS WITH MANAGEMENT SERVER"), the plugin installer 226 registers (by going through the reverse proxy 220) the plugins 200 with the extension manager 212 of the management service 214 at the management server 142. In one embodiment, the plugin installer 226 provides information from the plugin manifest 202 to the extension manager 212, so as to enable the extension manager 212 to maintain a list of registered plugins for the hosts/VMs that are being managed by the management server 142.

At a block 506 ("LOAD, VIA A FIRST PORT, ELEMENTS OF A CORE USER INTERFACE FROM THE MANAGEMENT SERVER, INTO A USER INTERFACE OF A WEB CLIENT"), a user (such as a system administrator) launches the web client 148 at the client device 146, in order to perform managerial tasks and/or other tasks using the tools at the management server 142. In one embodiment, the web client 148 opens the user interface 150 at the client device 146, and the user interface 150 will then become populated with default user interface elements obtained from the core user interface 210 at the management server 142. To perform this population, the user interface 150 loads (e.g., retrieves), via the first port-A 302 of the reverse proxy 220, the user interface elements from the core user interface 210 at the management server 142.

At a block 508 ("LOAD, VIA A SECOND PORT, USER INTERFACE ELEMENTS OF A FIRST PLUGIN FROM THE PLUGIN SERVER, INTO THE USER INTERFACE OF THE WEB CLIENT"), the user interface 150 communicates with the plugin server 152 (via the second port-B 312 of the reverse proxy 220) to load elements of a first plugin (e.g., the plugin 306) in order to render the plugin user interface 304. The elements may be loaded in the iframe 308 associated with the shadow DOM 310.

At a block 510 ("LOAD, VIA THE SECOND PORT, USER INTERFACE ELEMENTS OF A SECOND PLUGIN FROM THE PLUGIN SERVER, INTO THE USER INTERFACE OF THE WEB CLIENT"), the user interface 150 again communicates with the plugin server 152 (via the second port-B 312 of the reverse proxy 220) to load elements of a second plugin (e.g., the plugin 400) in order to render the plugin user interface 402. The elements may be loaded in the iframe 404 associated with the shadow DOM 406.

At a block 512 ("ISOLATE THE FIRST PLUGIN FROM THE SECOND PLUGIN, AND ISOLATE THE FIRST AND SECOND PLUGINS FROM THE CORE USER INTERFACE"), the plugins can operate with isolation from each other. For instance, the isolation may be provided by way of placing the iframes 308 and 404 in respective different shadow DOMs 310 and 406. Moreover, the plugins can be isolated from at least some elements of the core user interface 210, by forcing the plugins to communicate via the second port-B 312, while the core user interface 210 communicates via the first port-A 302.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 5. For example, the plugin server 152 can include a processor coupled to a computer-readable medium having instructions stored thereon, which in response to the execution by the processor, cause the plugin server 152 to perform at least some of the operations of the method 500 of FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to control the deployment and isolation of plugins.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to operate plugins in a virtualized computing environment, the method comprising:
installing the plugins at a plugin server, wherein the plugin server resides at a first computing device that is remote from a second computing device where a management server for the virtualized computing environment resides, and wherein the plugin server communicates with the management server via a reverse proxy of the management server;
loading, via a first port of the reverse proxy of the management server and into a user interface of a web client residing at a third computing device, elements of a core user interface from the management server;
loading, via a second port of the reverse proxy of the management server and into the user interface of the web client, a first plugin from the plugin server; and
isolating, at the third computing device, at least some elements of the loaded first plugin from the core user interface;
loading, via the second port of the reverse proxy of the management server and into the user interface of the web client, a second plugin from the plugin server; and
isolating, at the web client, the elements of the loaded first plugin from elements of the loaded second plugin, by using sandboxes,
wherein the loaded first plugin is executed at the third computing device outside of the management server and is prevented from executing at the management server.

2. The method of claim 1, wherein isolating at least some of the elements of the loaded first plugin from the core user interface includes using a sandbox at the web client to isolate the at least some of the elements of the loaded first plugin from the loaded elements of the core user interface.

3. The method of claim 1, wherein at least some of the plugins installed at the plugin server execute at the plugin server, and wherein the execution at the plugin server is triggered by the web client.

4. The method of claim 1, further comprising registering the plugins installed at the plugin server with an extension manager of the management server.

5. The method of claim 1, wherein forwarding/redirection rules to the plugin server are registered with the reverse proxy.

6. A non-transitory computer-readable medium having instructions stored thereon, which in response to execution by one or more processors, cause the one or more processors to perform or control performance of operations that pertain to a plurality of plugins in a virtualized computing environment, the operations comprising:
installing the plurality of plugins at a plugin server, wherein the plugin server resides at a first computing device that is remote from a second computing device where a management server for the virtualized computing environment resides, and wherein the plugin server communicates with the management server via a reverse proxy of the management server;
isolating a first plugin, of the plurality of plugins, from a core user interface provided by the management server; and
facilitating execution of the first plugin to support operation of elements of the core user interface that have been loaded by the management server to a web client, wherein isolating the first plugin from the core user interface includes loading elements of the first plugin into a first sandbox at the web client, wherein the web client communicates with each of the management server and the plugin server via the reverse proxy of the management server, and wherein the first plugin and the plugins at the plugin server are executed outside of the management server and are prevented from executing at the management server.

7. The non-transitory computer-readable medium of claim 6, wherein facilitating the execution of the first plugin includes executing the first plugin at the plugin server, and wherein the execution at the plugin server is triggered by the web client.

8. The non-transitory computer-readable medium of claim 6, wherein facilitating the execution of the first plugin includes:
enabling execution of the first plugin at the web client.

9. The non-transitory computer-readable medium of claim 6, wherein the operations further comprise:
loading a second plugin, of the plurality of plugins, into a second sandbox the web client; and
enabling execution of the second plugin at the web client, wherein the first and second sandboxes provide isolation between the execution of the first and second plugins at the web client.

10. The non-transitory computer-readable medium of claim 6, wherein the operations further comprise:
registering the plugins installed at the plugin server with an extension manager of the management server.

11. The non-transitory computer-readable medium of claim 6, wherein forwarding/redirection rules to the plugin server are registered with the reverse proxy.

12. A plugin server, comprising:
one or more processors; and
a non-transitory computer-readable medium having instructions stored thereon, which in response to execution by the one or more processors, cause the one or more processors to perform or control performance of operations, pertaining to a plurality of plugins in a virtualized computing environment, to:
install the plurality of plugins at the plugin server, wherein the plugin server resides at a first computing device that is remote from a second computing device where a management server for the virtualized computing environment resides, and wherein the plugin server communicates with the management server via a reverse proxy of the management server;
isolate a first plugin, of the plurality of plugins, from a core user interface provided by the management server; and
facilitate execution of the first plugin to support operation of elements of the core user interface that have been loaded by the management server to a web client residing at a third computing device, wherein the web client communicates with each of the management server and the plugin server via the reverse proxy of the management server, wherein the first plugin and the plugins at the plugin server are configured to execute outside of the management server and are prevented from being executed at the management server, and wherein the first plugin is configured to execute at the third computing device,
wherein the operations to isolate the first plugin from the core user interface include operations to:
load the first plugin into a first sandbox at the web client, and
wherein the instructions, in response to execution by the one or more processors, further cause the one or more processors to perform or control performance of operations to:
load a second plugin, of the plurality of plugins, into a second sandbox at the web client; and
enable execution of the second plugin at the web client, wherein the first and second sandboxes provide isolation between the execution of the first and second plugins at the web client.

13. The plugin server of claim 12, wherein at least some other plugins of the plurality of plugins installed at the plugin server are configured to execute at the plugin server, and wherein the execution at the plugin server is triggered by the web client.

14. The plugin server of claim 12, wherein the operations to facilitate the execution of the first plugin include operations to:
enable execution of the first plugin at the web client.

15. The plugin server of claim 12, wherein the instructions, in response to execution by the one or more processors, further cause the one or more processors to perform or control performance of operations to:
register the plugins installed at the plugin server with an extension manager of the management server.

16. The plugin server of claim 12, wherein forwarding/redirection rules to the plugin server are registered with the reverse proxy.

* * * * *